(12) United States Patent
Pandya et al.

(10) Patent No.: US 9,192,888 B2
(45) Date of Patent: Nov. 24, 2015

(54) APPARATUSES AND METHODS FOR REMOVING ACID GAS FROM SOUR GAS

(71) Applicant: UOP LLC, Des Plaines, IL (US)

(72) Inventors: Keyur Y. Pandya, Elgin, IL (US); David A. Wegerer, Lisle, IL (US); Clayton Colin Sadler, Arlington Heights, IL (US)

(73) Assignee: UOP LLC, Des Plaines, IL (US)

( * ) Notice: Subject to any disclaimer, the term of this patent is extended or adjusted under 35 U.S.C. 154(b) by 223 days.

(21) Appl. No.: 13/928,244

(22) Filed: Jun. 26, 2013

(65) Prior Publication Data

US 2015/0000525 A1    Jan. 1, 2015

(51) Int. Cl.
*B01D 53/14*    (2006.01)
*B01D 53/18*    (2006.01)

(52) U.S. Cl.
CPC ........ *B01D 53/1406* (2013.01); *B01D 53/1462* (2013.01); *B01D 53/18* (2013.01); *B01D 2252/103* (2013.01); *B01D 2252/2021* (2013.01); *B01D 2252/2026* (2013.01); *B01D 2252/20468* (2013.01)

(58) Field of Classification Search
CPC combination set(s) only.
See application file for complete search history.

(56) References Cited

U.S. PATENT DOCUMENTS

| | | | |
|---|---|---|---|
| 3,120,993 A * | 2/1964 | Kurt et al. | 423/563 |
| 3,435,590 A * | 4/1969 | Smith | 95/174 |
| 5,314,671 A | 5/1994 | Elgue et al. | |
| 7,754,102 B2 | 7/2010 | Zhang et al. | |
| 8,080,089 B1 | 12/2011 | Wen et al. | |
| 2005/0169825 A1 | 8/2005 | Cadours et al. | |
| 2009/0232861 A1 | 9/2009 | Wright et al. | |
| 2010/0025634 A1 | 2/2010 | Bravo et al. | |
| 2011/0168020 A1 | 7/2011 | Baburao et al. | |
| 2011/0283885 A1 | 11/2011 | Thiele et al. | |

FOREIGN PATENT DOCUMENTS

| | | | |
|---|---|---|---|
| JP | 2011213494 A | 10/2011 | |
| JP | 2012166139 A | 9/2012 | |

(Continued)

OTHER PUBLICATIONS

Ziegler, "The Role of Heat Exchangers in Post-Combustion CO2 Capture," AIChE Annual Meeting, Conference Proceedings 2011, 6p, 2011 AIChE Spring Meeting and 7th Global Congress on Process Safety, 11AIChE, Chicago, IL, Mar. 13, 2011 through Mar. 17, 2011, Code89447.

(Continued)

*Primary Examiner* — Duane Smith
*Assistant Examiner* — Cabrena Holecek

(57) ABSTRACT

Embodiments of apparatuses and methods for removing acid gas from sour gas are provided. In one example, an apparatus comprises an absorption zone. The absorption zone is configured for contacting the sour gas with an absorbent solvent that is at a first predetermined temperature of less than about 0° C. to remove the acid gas and form a treated gas stream that includes entrained absorbent solvent. A heat exchanger or heater is configured to heat the treated gas stream to a second predetermined temperature of greater than about 0° C. to form a partially heated treated gas stream. A water wash zone is configured for contacting the partially heated treated gas stream with water to remove the entrained absorbent solvent and form a solvent-depleted treated gas stream.

3 Claims, 3 Drawing Sheets

(56) References Cited

FOREIGN PATENT DOCUMENTS

| WO | 2010020017 A1 | 2/2010 |
|----|---------------|--------|
| WO | 2012038866 A1 | 3/2012 |

OTHER PUBLICATIONS

Salazar, et al., "Novel Solvent Selection and Solvent Stripping for CO2 Capture From Power Plants," AIChE 2012—2012 AIChE Annual Meeting, Conference Proceedings 2012, 1p, 2012 AIChE Annual Meeting, AIChE 2012, Pittsburgh, PA, Oct. 28, 2012 through Nov. 2, 2012.

Freguia, et al., "Modeling of CO2 Capture by Aqueous Monoethanolamine," AIChE Journal, vol. 49, Issue 7, Jul. 1, 2003, pp. 1676-1686.

* cited by examiner

APPARATUSES AND METHODS FOR REMOVING ACID GAS FROM SOUR GAS

TECHNICAL FIELD

The technical field relates generally to apparatuses and methods for removing acid gas from sour gas, and more particularly relates to apparatuses and methods for removing acid gas such as carbon dioxide and hydrogen sulfide from sour gas such as synthesis gas, natural gas, or the like using an absorbent solvent.

BACKGROUND

Acid gas removal processes are widely used in the gas processing industries to separate acid gas from sour gas, such as synthesis gas (hereinafter "syngas"), natural gas, or other process gases that contain acid gas. For example, syngas streams can be produced by gasification of coal, coke, or heavy hydrocarbon oils. Some examples of acid gases are hydrogen sulfide ($H_2S$), carbonyl sulfide (COS), and other sulfur compounds, carbon dioxide ($CO_2$), and hydrogen cyanide (HCN). By separating the acid gases, the syngas stream is made more suitable for combustion and/or further processing.

One conventional approach for removing acid gas from sour gas uses a physical solvent (i.e., absorbent solvent) in countercurrent contacting flow with a sour gas stream. Physical solvents, unlike chemical solvents, do not involve chemical reactions for acid gas removal but rather involve a physical mechanism(s), such as absorption, for acid gas removal. Some examples of physical solvents include n-methyl-2-pyrrolidone, methanol, propylene carbonate, and the like. Additionally, the acid gas absorption capacity of many physical solvents favors lower temperatures.

During countercurrent contacting flow, acid gas from the sour gas is absorbed into the physical solvent, which is in the liquid phase, to form a treated gas stream that is substantially free of acid gas and a loaded physical solvent stream that is partially or substantially saturated with the acid gas. Depending upon the vapor pressure of the physical solvent, some of the physical solvent may be entrained in the treated gas stream. Physical solvents are generally expensive and can cause damage to downstream equipment for further processing of the treated gas stream. As such, it is desirable to recover the physical solvent that is entrained in the treated gas stream. Unfortunately, current approaches for recovering the entrained physical solvent are not necessarily feasible at lower temperatures that otherwise may favor improved acid gas absorption.

Accordingly, it is desirable to provide apparatuses and methods for removing acid gas from sour gas using an absorbent solvent with improved acid gas absorption. Additionally, it is desirable to provide apparatuses and methods for removing acid gas from sour gas using an absorbent solvent to form a treated gas stream and for recovering entrained absorbent solvent in the treated gas stream. Furthermore, other desirable features and characteristics of the present invention will become apparent from the subsequent detailed description and the appended claims, taken in conjunction with the accompanying drawings and this background.

BRIEF SUMMARY

Apparatuses and methods for removing acid gas from sour gas are provided herein. In accordance with an exemplary embodiment, a method for removing acid gas from sour gas comprises the steps of contacting the sour gas with an absorbent solvent that is at a first predetermined temperature of less than about 0° C. to remove the acid gas and form a treated gas stream that includes entrained absorbent solvent. The treated gas stream is heated to a second predetermined temperature of greater than about 0° C. to form a partially heated treated gas stream. The partially heated treated gas stream is contacted with water to remove the entrained absorbent solvent and form a solvent-depleted treated gas stream.

In accordance with another exemplary embodiment, a method for removing acid gas from sour gas is provided. The method comprises the steps of separating the acid gas from the sour gas with an absorbent solvent in an absorption zone to form a treated gas stream that includes entrained absorbent solvent and that is at a first predetermined temperature of less than about 0° C. The treated gas stream is heated to a second predetermined temperature of greater than about 0° C. to form a partially heated treated gas stream. The partially heated treated gas stream is introduced to a water wash zone to remove the entrained absorbent solvent with water and form a solvent-depleted treated gas stream. A sour gas stream is cooled to a third predetermined temperature using the solvent-depleted treated gas stream, the treated gas stream, a cooler, or a combination thereof to form a cooled sour gas stream. The cooled sour gas stream is introduced to the absorption zone.

In accordance with another exemplary embodiment, an apparatus for removing acid gas from sour gas is provided. The apparatus comprises an absorption zone. The absorption zone is configured for contacting the sour gas with an absorbent solvent that is at a first predetermined temperature of less than about 0° C. to remove the acid gas and form a treated gas stream that includes entrained absorbent solvent. A heat exchanger or heater is in fluid communication with the absorption zone. The heat exchanger or heater is configured to heat the treated gas stream to a second predetermined temperature of greater than about 0° C. to form a partially heated treated gas stream. A water wash zone is in fluid communication with the heat exchanger or the heater. The water wash zone is configured for contacting the partially heated treated gas stream with water to remove the entrained absorbent solvent and form a solvent-depleted treated gas stream.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Various embodiments contemplated herein relate to apparatuses and methods for removing acid gas from sour gas. The exemplary embodiments taught herein provide an absorption zone for contacting a sour gas stream that contains acid gas with an absorbent solvent that is at a relatively low temperature of less than about 0° C. to favor enhanced acid gas absorption capacity of the absorbent solvent. As used herein, the term "zone" refers to an area including one or more equipment items and/or one or more sub-zones. Equipment items can include one or more absorbers or absorber vessels, reactors, regenerators, heaters, exchangers, coolers/chillers, pipes, pumps, compressors, and controllers. Additionally, an equipment item, such as an absorber, reactor, dryer, or vessel, can further include one or more zones or sub-zones.

In an exemplary embodiment, during contact in the absorption zone, acid gas such as carbon dioxide, hydrogen sulfide, and the like are readily removed from the sour gas stream and absorbed by the absorbent solvent to form a treated gas stream that is substantially free of acid gas but includes entrained absorbent solvent. The treated gas stream is then heated to a temperature of greater than about 0° C. to form a partially heated treated gas stream.

In an exemplary embodiment, the absorbent solvent is highly soluble (e.g., fully miscible) in water and the partially heated treated gas stream is introduced to a water wash zone. In the water wash zone, the partially heated treated gas stream is contacted with water to remove the entrained absorbent solvent and form a solvent-depleted treated gas stream. Because the partially heated treated gas stream is at a temperature that is greater than the freezing point of water (e.g., greater than about 0° C.), recovering the entrained absorbent solvent with water is feasible without freezing the water and disturbing operation of the water wash zone. The solvent-depleted treated gas stream is then passed along, for example, for further processing and/or combustion.

Figure 1:
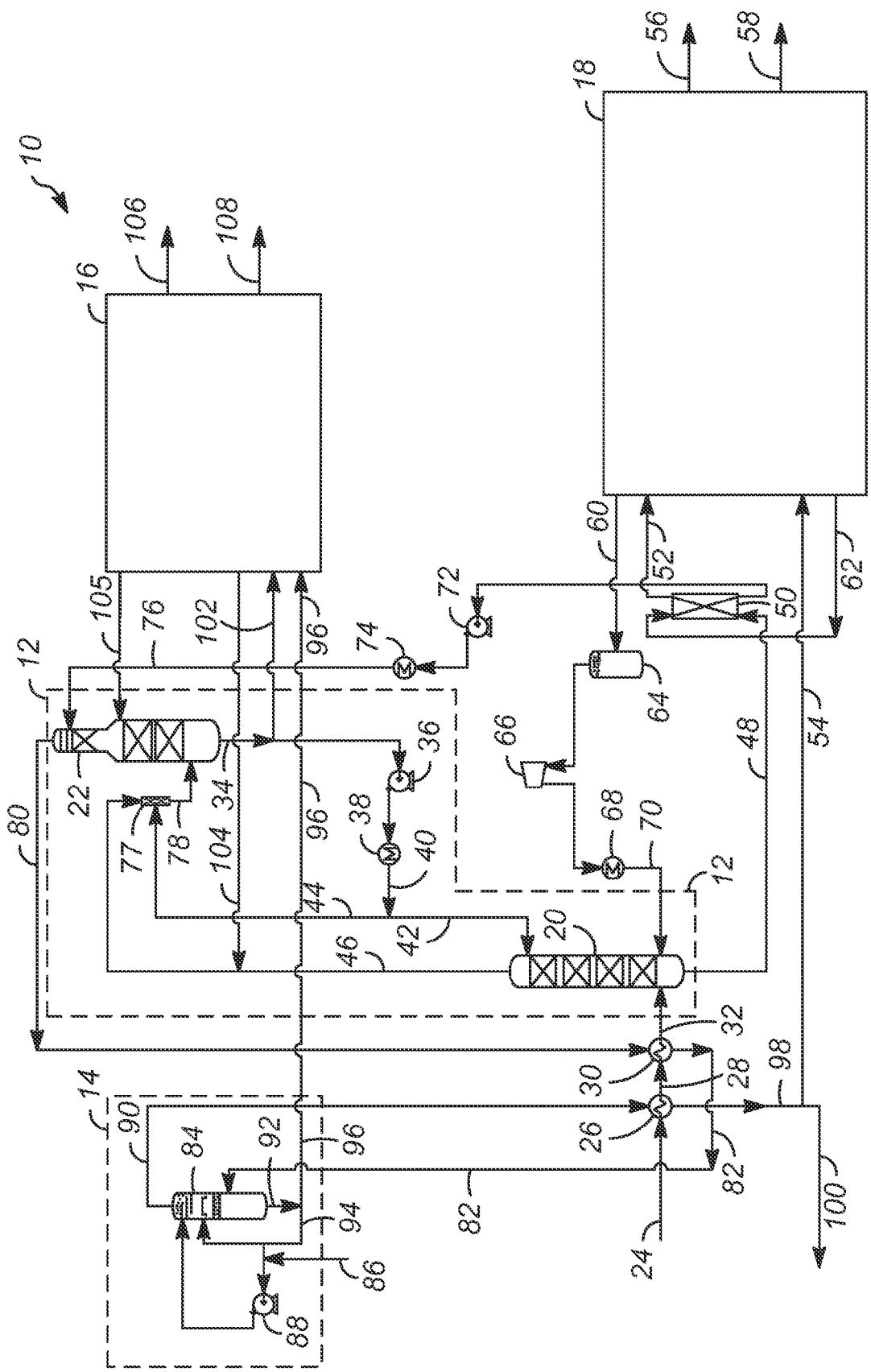
FIG. 1 schematically illustrates an apparatus and method for removing acid gas from sour gas in accordance with an exemplary embodiment.

FIG. 1 schematically illustrates an apparatus 10 for removing acid gas from sour gas in accordance with an exemplary embodiment. The apparatus 10 comprises an absorption zone 12, a water wash zone 14, a $CO_2$ recovery zone 16, and an acid gas recovery and solvent regeneration zone 18 that are in fluid communication with each other. As illustrated, the absorption zone 12 comprises an absorber 20 and an absorber 22 that are in fluid communication. While two absorbers 20 and 22 are shown, it will be appreciated that the absorption zone 12 can have one absorber or more than two absorbers. As will be discussed in further detail below, the absorbers 20 and 22 cooperate in a two-stage counter-current flow process using an absorbent solvent that absorbs and removes acid gas from a sour gas stream 24.

In an exemplary embodiment, the absorbent solvent is a physical solvent that effectively absorbs acid gas. Various non-limiting examples of physical solvents include various dimethyl ethers of polyethylene glycol, n-methyl-2-pyrrolidone, methanol, propylene carbonate, and the like. In an exemplary embodiment, the absorbent solvent is a mixture of dimethyl ethers of polyethylene glycol. Some examples of commercially available suitable absorbent solvent mixtures of dimethyl ethers of polyethylene glycol are available from Dow Chemical Company, located in Midland, Mich., under the trade name Selexol™ and SelexolMAX™. Other suitable absorbent solvents that absorb and/or remove acid gas from sour gas may also be used. In an exemplary embodiment, the acid gas absorption capacity of the absorbent solvent favors lower temperatures such as less than about 0° C., for example of from about −15 to about −0.1° C.

In an exemplary embodiment, the sour gas stream 24 is a syngas stream containing syngas and comprising, for example, hydrogen ($H_2$), carbon monoxide (CO), water vapors ($H_2O$), light hydrocarbons including methane ($CH_4$), and various acid gases including hydrogen sulfide ($H_2S$), carbonyl sulfide (COS) and other sulfur compounds, carbon dioxide ($CO_2$), and hydrogen cyanide (HCN). Alternatively, the sour gas stream 24 can be a natural gas stream or other process gas stream that contains acid gas.

In an exemplary embodiment, the sour gas stream 24 has a temperature of from about 30 to about 50° C. As will be discussed in further detail below, the sour gas stream 24 is passed through a heat exchanger 26 to form a partially cooled sour gas stream 28. The partially cooled sour gas stream 28 is passed through a heat exchanger 30 to form a cooled sour gas stream 32. In an exemplary embodiment, the partially cooled sour gas stream 28 has a temperature of from about 20 to about 40° C. and the cooled sour gas stream 32 has a temperature of from about 15 to about 30° C. The cooled sour gas stream 32 is passed along to the absorption zone 12 and is introduced to the absorber 20.

As illustrated and will be discussed in further detail below, a partially loaded absorbent solvent stream 34 is removed from the absorber 22. The partially loaded absorbent solvent stream 34 contains the absorbent solvent that has been partially or fully saturated with $CO_2$ but still has substantial acid gas absorption capacity for other acid gas species such as preferentially for $H_2S$. In an exemplary embodiment, the partially loaded absorbent solvent stream 34 has a temperature of greater than about 0° C., such as from about 0.1 to about 15° C., for example 0.1 to about 5° C. The partially loaded absorbent solvent stream 34 is passed through a pump 36 and a chiller/cooler 38 to cool the stream and form a partially loaded absorbent solvent stream 40. In an exemplary embodiment, the partially loaded absorbent solvent stream 40 has a temperature of less than about 0° C., such as from about −15 to about −0.1° C., for example from about −10 to about −5° C. As illustrated, the partially loaded absorbent solvent stream 40 is divided to form partially loaded absorbent solvent streams 42 and 44. The partially loaded absorbent solvent stream 42 is passed along and introduced to the absorber 20.

In the absorber 20, the cooled sour gas stream 32 and the partially loaded absorbent solvent stream 42 contact each other in countercurrent flow to remove acid gas including $H_2S$ from the cooled sour gas stream 32 to form a $H_2S$-depleted sour gas stream 46 and a spent absorbent solvent stream 48. Because the partially loaded absorbent solvent stream 42 has a relatively low temperature of less than about 0° C. (e.g., about −15 to about −0.1° C., for example from about −10 to about −5° C.), the acid gas absorption capacity of the partially loaded absorbent solvent stream 42 is enhanced to readily absorb $H_2S$ as well as other acid gases. In an exemplary embodiment, the $H_2S$-depleted sour gas stream 46 has a temperature of from about −10 to about 10° C., such as from about −5 to about 5° C., for example about −2 to about 2° C. In an exemplary embodiment, the spent absorbent solvent stream 48 has a temperature of from about 10 to about 25° C., for example from about 15 to about 20° C.

As illustrated, the spent absorbent solvent stream 48 is removed from the absorber 20 and is passed through a heat exchanger 50 to heat the stream 48 and form a spent absorbent solvent stream 52. In an exemplary embodiment, the spent absorbent solvent stream 52 has a temperature of from about 100 to about 130° C., for example from about 110 to about 125° C. The spent absorbent solvent stream 52 is then passed along and introduced to the acid gas recovery and solvent regeneration zone 18.

As will be discussed in further detail below, the acid gas recovery and solvent regeneration zone 18 also receives a stripping gas stream 54. The acid gas recovery and solvent regeneration zone 18 is configured to regenerate the spent absorbent solvent stream 52 by stripping the acid gas from the stream 52 to form an acid gas stream 56, a purge water stream 58, a recycle gas stream 60 that contains $CO_2$, and a lean absorbent solvent stream 62. The acid gas recovery and solvent regeneration zone 18 may be configured with various equipment items such as a concentrator, one or more flash drums, and/or a regenerator as are known in the art and to use the stripping gas stream 54 to regenerate the absorbent solvent to form the lean absorbent solvent stream 62 (i.e., absorbent solvent stream with substantially or fully regenerated acid gas absorption capacity). In an exemplary embodiment, the lean absorbent solvent stream 62 has a temperature of from about 130 to about 170° C., for example from about 140 to about 160° C.

As illustrated, the recycle gas stream 60 is passed through a stripping gas knockout drum 64, a compressor 66, and a chiller/cooler 68 to form a recycle gas stream 70. In an exemplary embodiment, the recycle gas stream 70 has a temperature of less than 0° C., such as from about −15 to about −0.1° C., for example from about −10 to about −5° C. The recycle gas stream 70 is passed to the absorption zone 12 and introduced to the absorber 20 to help form part of the $H_2S$-depleted sour gas stream 46.

The lean absorbent solvent stream 62 is passed through the heat exchanger 50, a pump 72, and a chiller/cooler 74 to form a lean absorbent solvent stream 76. In an exemplary embodiment, the lean absorbent solvent stream 76 has a temperature of less than 0° C., such as from about −15 to about −0.1° C., for example from about −10 to about −5° C. The lean absorbent solvent stream 76 passed to the absorption zone 12 and is introduced to the absorber 22.

The $H_2S$-depleted sour gas stream 46 is combined with the partially loaded absorbent solvent stream 44 in a static mixer 77 to form a combined stream 78. In an exemplary embodiment, the combined streams 78 has a temperature of from about −10 to about 10° C., such as from about −5 to about 5° C., for example from about −5 to about 0° C. The combined stream 78 is passed along and introduced to the absorber 22.

In the absorber 22, the combined stream 78 that contains the $H_2S$-depleted sour gas stream 46 and the partially loaded absorbent solvent stream 44 contacts the lean absorbent solvent stream 76 in countercurrent flow to remove acid gas including $CO_2$ from the $H_2S$-depleted sour gas stream 46 to form a treated gas stream 80 and the partially loaded absorbent solvent stream 34. Because the lean absorbent solvent stream 76 has a relatively low temperature of less than about 0° C. (e.g., about −15 to about −0.1° C., for example from about −10 to about −5° C.), the acid gas absorption capacity of the lean absorbent solvent stream 76 is enhanced to readily absorb $CO_2$ as well as other acid gases. In an exemplary embodiment, the treated gas stream 80 has a temperature of less than 0° C., such as from about −15 to about −0.1° C., for example from about −10 to about −5° C. In an exemplary embodiment, the treated gas stream 80 is substantially free of acid gas but depending upon the vapor pressure of the absorbent solvent contains some amount of entrained absorbent solvent.

In an exemplary embodiment, the treated gas stream 80 is passed along and introduced to the heat exchanger 30. In the heat exchanger 30, indirect heat exchange occurs between the partially cooled sour gas stream 28 and the treated gas stream 80 to form a partially heated treated gas stream 82 and the cooled sour gas stream 32. In an exemplary embodiment, the partially heated treated gas stream 82 has a temperature of greater than 0° C., such as from about 0.1 to about 25° C., for example from about 0.1 to about 5° C.

The partially heated treated gas stream 82 is passed along to the water wash zone 14 and is introduced to a product wash drum 84. A make-up water stream 86 is passed through a pump 88 and is introduced to the product wash drum 84. In the product wash drum 84, the partially heated treated gas stream 82 is contacted with water to remove the entrained solvent to form a solvent-depleted treated gas stream 90 and a water-solvent stream 92. In an exemplary embodiment, the partially heated treated gas stream 82 is contacted with water that has a temperature of from about 20 to about 50° C. Because the partially heated treated gas stream 82 is at a temperature of greater than the freezing point of water (e.g., greater than about 0° C.), removing the entrained solvent with water is feasible without disrupting operation of the water wash zone 14. A portion 94 of the water-solvent stream is recycled back to the product wash drum 84 while a remaining portion 96 of the water-solvent stream 92 is directed to the $CO_2$ recovery zone 16.

As illustrated, the solvent-depleted treated gas stream 90 is passed through the heat exchanger 26 for indirect heat exchange with the sour gas stream 24 and to form a heated solvent-depleted treated gas stream 98. In an exemplary embodiment, the heated solvent-depleted treated gas stream 98 has a temperature of from about 35 to about 50° C. A portion of the heated solvent-depleted treated gas stream 98 is used to form the stripping gas stream 54 and the remaining portion 100 of the heated solvent-depleted treated gas stream 98 is removed from the apparatus 10 for further processing and/or combustion.

In an exemplary embodiment, the $CO_2$ recovery zone 16 receives a portion 102 of the partially loaded absorbent solvent stream 34 and the remaining portion 96 of the water-solvent stream 92. The $CO_2$ recovery zone 16 is configured to recover $CO_2$ and the entrained absorbent solvent to form a recycle $CO_2$ stream 104, a semi-lean absorbent solvent stream 105 that is partially loaded with $CO_2$, a medium pressure $CO_2$ product stream 106, and a low pressure $CO_2$ product stream 108. The $CO_2$ recovery zone 16 may use one or more $CO_2$ flash drums as are known in the art to recover $CO_2$ and form the recycle $CO_2$ stream 104, the semi-lean absorbent solvent stream 105, the medium pressure $CO_2$ product stream 106, and the low pressure $CO_2$ product stream 108. As illustrated, the semi-lean absorbent solvent stream 105 is recycled back to the absorber 22 to further enhance the absorption of acid gas and to help form the treated gas stream 80 and the partially loaded absorbent solvent stream 34.

Figure 2:
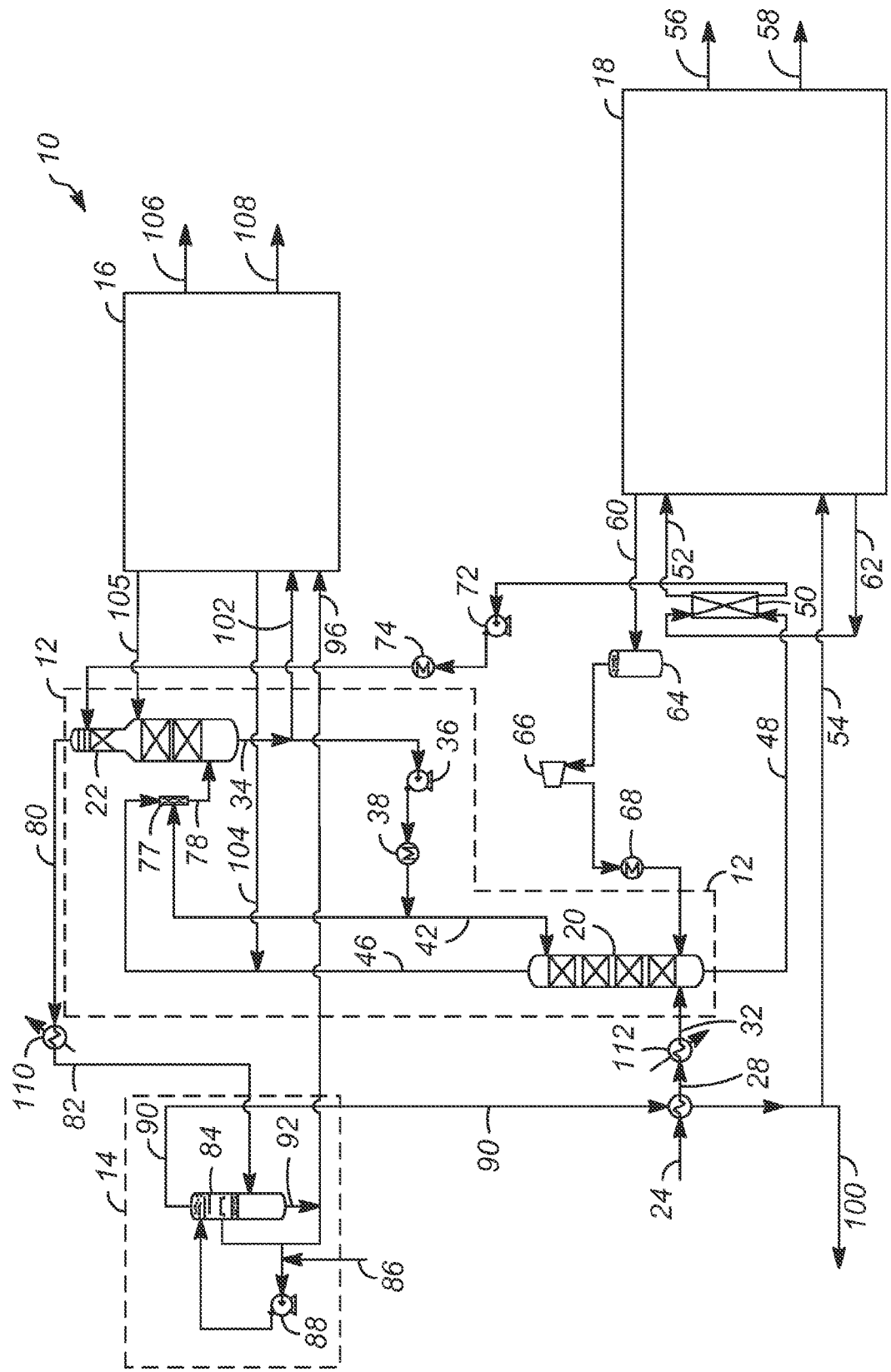
FIG. 2 schematically illustrates an apparatus and method for removing acid gas from sour gas in accordance with an exemplary embodiment.

FIG. 2 schematically illustrates the apparatus 10 in accordance with another exemplary embodiment. The apparatus 10 shown in FIG. 2 is similarly configured to the apparatus 10 described above in relation to FIG. 1 including the absorption zone 12, the water wash zone 14, the $CO_2$ recovery zone 16, and the acid gas recovery and solvent regeneration zone 18 but with the exception that the heat exchanger 30 shown in FIG. 1 is replaced with a heater 110 and a cooler 112. In particular, the heater 110 is used to heat the treated gas stream 80 to form the partially heated treated gas stream 82 and the cooler 112 is used to cool the partially cooled sour gas stream 28 to form the cooled sour gas stream 32.

Figure 3:
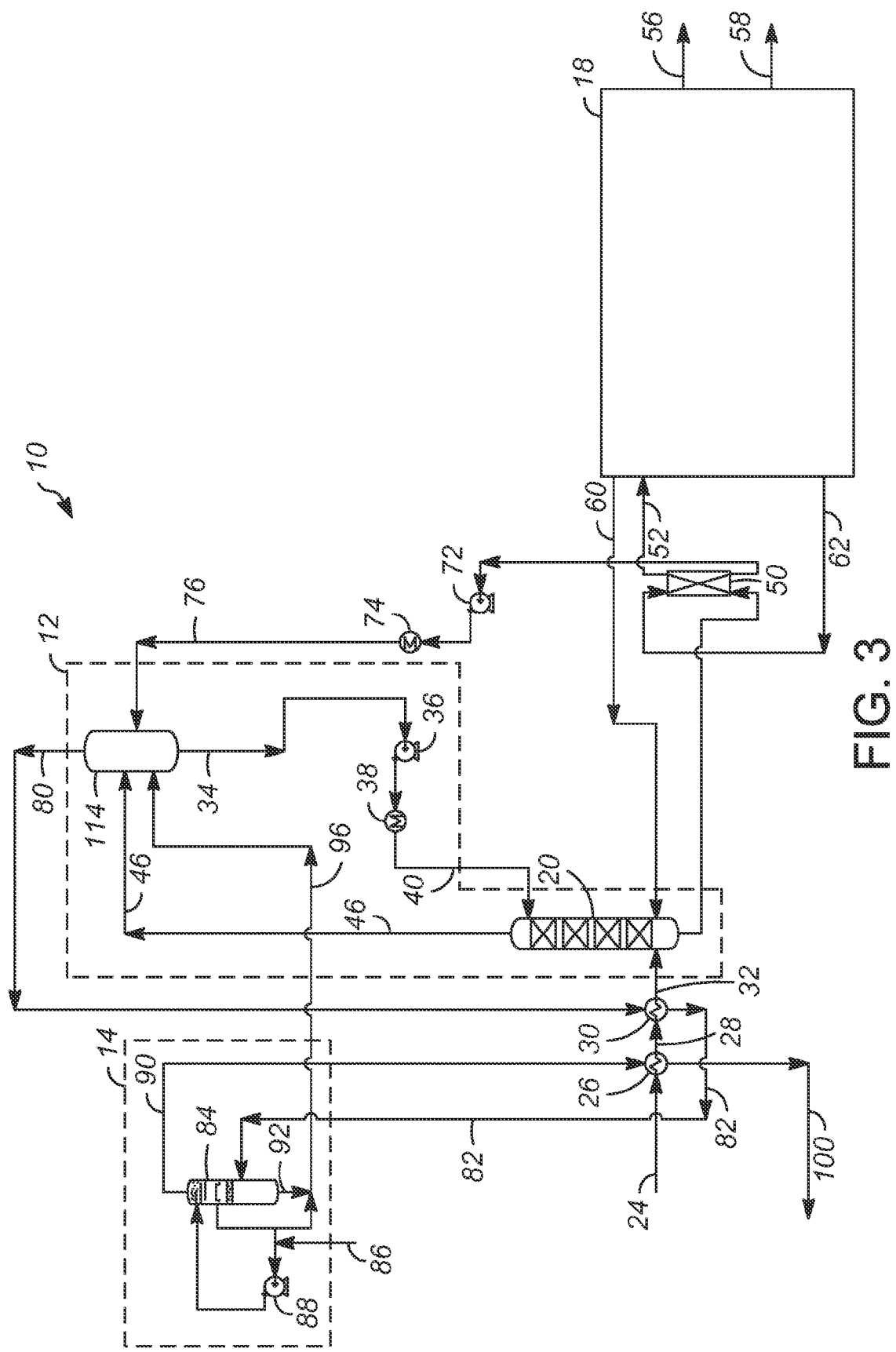
FIG. 3 schematically illustrates an apparatus and method for removing acid gas from sour gas in accordance with an exemplary embodiment.

FIG. 3 schematically illustrates the apparatus 10 in accordance with another exemplary embodiment. The apparatus 10 shown in FIG. 3 is similarly configured to the apparatus 10 described above in relation to FIG. 1 including the absorption zone 12, the water wash zone 14, the acid gas recovery and solvent regeneration zone 18 but with the exception that the absorber 22 shown in FIG. 1 has been replaced with a pre-absorption vessel 114 and the $CO_2$ recovery zone 16 has been eliminated. The pre-absorption vessel 114 essentially acts as a second stage to the absorber 20 for absorbing $CO_2$ but without using the $CO_2$ recovery zone 16 to recover $CO_2$.

As illustrated, the pre-absorption vessel 114 receives the remaining portion 96 of the water-solvent stream 92 from the water wash zone 14, the $H_2S$-depleted sour gas stream 46 from the absorber 20, and the lean absorbent solvent stream 76 from the acid gas recovery and solvent regeneration zone 18. In the pre-absorption vessel 114, the $H_2S$-depleted sour gas stream 46 contacts the lean absorbent solvent stream 76 and the remaining portion 96 of the water-solvent stream 92 that contains absorbent solvent to remove acid gas including $CO_2$ from the $H_2S$-depleted sour gas stream 46 to form the treated gas stream 80 and the partially loaded absorbent solvent stream 34.

Accordingly, apparatuses and methods for removing acid gas from sour gas. The exemplary embodiments taught herein provide an apparatus with an absorption zone. The absorption zone is configured for contacting the sour gas with an absorbent solvent that is at a predetermined temperature of less than about 0° C. to remove the acid gas and form a treated gas stream that includes entrained absorbent solvent. A heat exchanger or heater is configured to heat the treated gas stream to a predetermined temperature of greater than about 0° C. to form a partially heated treated gas stream. A water wash zone is configured for contacting the partially heated treated gas stream with water to remove the entrained absorbent solvent and form a solvent-depleted treated gas stream.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A method for removing acid gas from sour gas, the method comprising the steps of:
    separating the acid gas from the sour gas with an absorbent solvent in an absorption zone to form a treated gas stream that includes entrained absorbent solvent and that is at a first predetermined temperature of less than about 0° C.;
    heating the treated gas stream to a second predetermined temperature of greater than about 0° C. to form a partially heated treated gas stream;
    introducing the partially heated treated gas stream to a water wash zone to remove the entrained absorbent solvent with water and form a solvent-depleted treated gas stream;
    cooling a sour gas stream to a third predetermined temperature using the solvent-depleted treated gas stream, the treated gas stream, a cooler, or a combination thereof to form a cooled sour gas stream; and
    introducing the cooled sour gas stream to the absorption zone;
wherein the step of cooling comprises indirect heat exchanging from the sour gas stream to the treated gas stream in a first heat exchanger to form the cooled sour gas stream and the partially heated treated gas stream and wherein the step of cooling comprises indirect heat exchanging from the sour gas stream to the solvent-depleted treated gas stream in a second heat exchanger upstream from the first heat exchanger to form a partially cooled sour gas stream and a heated solvent-depleted treated gas stream, and wherein the step of indirect heat exchanging from the sour gas stream to the treated gas stream comprises indirect heat exchanging from the partially cooled sour gas stream to the treated gas stream to form the cooled sour gas stream.

2. A method for removing acid gas from sour gas, the method comprising the steps of:
    separating the acid gas from the sour gas with an absorbent solvent in an absorption zone to form a treated gas stream, wherein said treated gas stream includes entrained absorbent solvent and is at a first predetermined temperature of less than about 0° C.;
    heating the treated gas stream to a second predetermined temperature of greater than about 0° C. to form a partially heated treated gas stream;
    introducing the partially heated treated gas stream to a water wash zone to remove the entrained absorbent solvent with water and form a solvent-depleted treated gas stream;
    cooling a sour gas stream to a third predetermined temperature using the solvent-depleted treated gas stream, the treated gas stream, a cooler, or a combination thereof to form a cooled sour gas stream; and
    introducing the cooled sour gas stream to the absorption zone, wherein the step of introducing the cooled sour gas stream comprises introducing the cooled sour gas stream to a first absorber, wherein the first absorber is configured to contact the cooled sour gas stream with a partially loaded absorbent solvent stream at a fourth predetermined temperature of less than about 0° C. to remove the acid gas including $H_2S$ to form a $H_2S$-depleted sour gas stream and a spent absorbent solvent stream;
wherein the step of introducing the cooled sour gas stream further comprises introducing the $H_2S$-depleted sour gas stream to a second absorber downstream from the first absorber and that is configured to contact the $H_2S$-depleted sour gas stream with a lean absorbent solvent stream that is at a fifth predetermined temperature of less than about 0° C. to remove the acid gas including $CO_2$ to form the treated gas stream and the partially loaded absorbent solvent stream.

3. The method of claim 2, wherein the step of introducing the $H_2S$-depleted sour gas stream comprises contacting the $H_2S$-depleted sour gas stream with the lean absorbent solvent stream that is at the fifth predetermined temperature of from about −15 to about −0.1° C.

* * * * *